US010135713B2

(12) United States Patent
Robitaille

(10) Patent No.: US 10,135,713 B2
(45) Date of Patent: *Nov. 20, 2018

(54) LAYER-3 PERFORMANCE MONITORING SECTIONALIZATION

(71) Applicant: Accedian Networks Inc., Saint-Laurent (CA)

(72) Inventor: Claude Robitaille, St-Placide (CA)

(73) Assignee: Accedian Networks Inc., Saint-Laurent (CA)

(*) Notice: Subject to any disclaimer, the term of this patent is extended or adjusted under 35 U.S.C. 154(b) by 0 days.

This patent is subject to a terminal disclaimer.

(21) Appl. No.: 15/403,362

(22) Filed: Jan. 11, 2017

(65) Prior Publication Data

US 2017/0126540 A1 May 4, 2017

Related U.S. Application Data

(63) Continuation of application No. 15/057,540, filed on Mar. 1, 2016, now Pat. No. 9,577,913, which is a (Continued)

(51) Int. Cl.
*H04L 12/26* (2006.01)
*H04L 29/08* (2006.01)

(52) U.S. Cl.
CPC .......... *H04L 43/50* (2013.01); *H04L 43/0835* (2013.01); *H04L 43/0841* (2013.01); *H04L 69/324* (2013.01); *H04L 69/325* (2013.01)

(58) Field of Classification Search
CPC ............. H04L 43/0829; H04L 43/0841; H04L 43/0835
See application file for complete search history.

(56) References Cited

U.S. PATENT DOCUMENTS 6,865,602 B1 3/2005 Nijemcevic
6,937,594 B2 8/2005 Smith
(Continued)

FOREIGN PATENT DOCUMENTS

EP 1734690 12/2006

OTHER PUBLICATIONS

Cisco IP SLA Probe User's Guide, Feb. 7, 2007 (5 pages).
(Continued)

*Primary Examiner* — Khaled Kassim
*Assistant Examiner* — Syed S Ali
(74) *Attorney, Agent, or Firm* — Stratford Managers Corporation

(57) ABSTRACT

A method is disclosed for the collection of performance metrics by establishing service operations administration and maintenance (OAM) sessions between an actuator and a plurality of reflectors in a communication network. Test packets from an actuator simultaneously reach a plurality of reflectors along a test path. Each single test packet results into a plurality of test results, one per reflector, with quasi-synchronous performance metrics to sectionalize a network and more efficiently isolate fault or performance problems without the need for additional test packets to isolate the issue. Another method is disclosed wherein an actuator generates and transmits a plurality of simultaneous test packets, one per NID device, resulting into a plurality of test results, one per reflector, with quasi-synchronous performance metrics to sectionalize a network and more efficiently isolate fault or performance problems without the need for additional test packets to isolate the issue.

10 Claims, 7 Drawing Sheets

Related U.S. Application Data continuation of application No. 13/840,404, filed on Mar. 15, 2013, now Pat. No. 9,306,830.

(60) Provisional application No. 61/758,370, filed on Jan. 30, 2013.

(56) References Cited

U.S. PATENT DOCUMENTS

| | | | |
|---|---|---|---|
| 8,665,746 B2* | 3/2014 | Mack-Crane | H04L 43/0888 370/253 |
| 2005/0099954 A1 | 5/2005 | Mohan | |
| 2005/0243731 A1 | 11/2005 | Smith | |
| 2006/0285501 A1 | 12/2006 | Damm | |
| 2007/0274227 A1 | 11/2007 | Rauscher | |
| 2008/0273467 A1 | 11/2008 | Zhang | |
| 2009/0175274 A1 | 7/2009 | Aggarwal | |
| 2011/0222412 A1 | 9/2011 | Kompella | |
| 2012/0029442 A1 | 2/2012 | Boyd | |
| 2012/0087235 A1 | 4/2012 | Smith | |
| 2012/0128000 A1 | 5/2012 | Baillargeon | |
| 2013/0010607 A1 | 1/2013 | Kini | |
| 2013/0044604 A1 | 2/2013 | Hatley | |
| 2013/0088977 A1 | 4/2013 | Baillargeon | |
| 2013/0201316 A1 | 8/2013 | Binder | |
| 2013/0227055 A1 | 8/2013 | Vasseur | |
| 2014/0029441 A1* | 1/2014 | Nydell | H04L 43/0864 370/241.1 |
| 2014/0029442 A1* | 1/2014 | Wallman | H04L 69/22 370/241.1 |
| 2014/0067902 A1 | 3/2014 | Wang | |
| 2014/0105044 A1* | 4/2014 | Baillargeon | H04L 43/0835 370/252 |
| 2014/0169166 A1 | 6/2014 | Anand | |
| 2014/0169183 A1* | 6/2014 | Allan | H04L 43/10 370/248 |
| 2014/0258524 A1 | 9/2014 | Thyni | |
| 2014/0301215 A1* | 10/2014 | Somoskoi | H04L 43/0852 370/252 |
| 2015/0019713 A1* | 1/2015 | Bugenhagen | H04L 43/0811 709/224 |
| 2015/0023179 A1* | 1/2015 | Stein | H04L 43/0811 370/241.1 |
| 2015/0023186 A1 | 1/2015 | Vasseur | |
| 2015/0058479 A1* | 2/2015 | Kolhi | H04L 43/0811 709/224 |
| 2015/0195205 A1 | 7/2015 | Flinta | |
| 2017/0180108 A1* | 6/2017 | D'Eletto | H04L 7/0012 |
| 2017/0302548 A1* | 10/2017 | Sarangapani | H04L 43/0864 |

OTHER PUBLICATIONS

Hedayat, et al., "A Two-Way Active Measurement Protocol (TWAMP)," Oct. 2008 (24 pages).
Network Working Group, Traceroute Using an IP Option, G. Malkin, Xylogics, Inc., Jan. 1993 (7 pages).
Settey, "Advanced Quality Performance Monitoring with IP SLA," 2008 (88 pages).
Sun, L. et al. "Flow-Based Performance Measurement." Internet Engineering Task Force. Jun. 29, 2012 (15 pages).
Extended European Search Report dated Nov. 12, 2013 which issued in European Patent Application No. 13177793.0 (11 pages).
Extended European Search Report dated Nov. 15, 2013 which issued in European Patent Application No. 13177792.2 (9 pages).

* cited by examiner

LAYER-3 PERFORMANCE MONITORING SECTIONALIZATION

CROSS-REFERENCE TO RELATED APPLICATIONS

This application is a continuation of U.S. application Ser. No. 15/057,540, filed Mar. 1, 2016, now allowed, which is a continuation of U.S. application Ser. No. 13/840,404, filed Mar. 15, 2013, now U.S. Pat. No. 9,306,830, which claims priority to U.S. Provisional Application No. 61/758,370, filed Jan. 30, 2013, each of which is hereby incorporated by reference herein in its entirety.

TECHNICAL FIELD

The present disclosure relates generally to computer processing environments and, in some embodiments, more particularly to processor-executable instructions, such as program modules, being executed in a distributed computing environment.

BRIEF SUMMARY

Aspects of this disclosure relate to sectionalization of a communication network for the purpose of improving the isolation of faults and the collection of performance monitoring metrics with modified Two-Way Active Measurement Protocol (TWAMP) requests and replies and without requiring explicit layer-3 addressing information of the devices implementing the reflector function in the context of an Operations Administration and Maintenance (OAM) framework. Additional information can be found, for example, in U.S. patent application Ser. No. 13/557,138, which was filed on Jul. 24, 2012, and U.S. patent application Ser. No. 13/552,063, which was filed on Jul. 18, 2012, each of which is incorporated herein by reference in its respective entirety and for all purposes.

One aspect of the present disclosure is directed to a method of establishing service operations administration and maintenance (OAM) sessions between an actuator and a plurality of reflectors for the purpose of collecting performance metrics. The collected performance metrics can then be used to sectionalize a network for the purpose of improving the isolation of faults and performance problems.

A further aspect of this disclosure is directed to a method of reaching a plurality of reflectors with a single test packet where a test packet is forwarded by a reflector to a next reflector in the downstream direction along a test path and where each reflector replies directly to the actuator with the requested performance metrics. In order to simplify the installation and the operation of the reflectors, these reflectors do not require unique layer-3 addressing information. Instead, they borrow the IP address of another device downstream to the last reflector along the test path.

According to an additional aspect of the present disclosure, a system is disclosed for assigning a test reply from a reflector to the appropriate reflector where a sequence number is redefined to include a unique reflector identifier. The reflector identifier is either assigned statically for each reflector or it can be dynamically determined.

Aspects of the present disclosure are also directed to a method of establishing service operations administration and maintenance (OAM) sessions between an actuator and a plurality of reflectors in a communication network. The method includes: continuously monitoring, by one or more of the reflectors, any test packets transmitted by the actuator; transmitting by the actuator a test packet to a first one of the reflectors; forwarding, by the first reflector, the test packet to a second one of the reflectors next along a test path with respect to the first reflector; generating, by each of the first and second reflectors, a test reply to the actuator, each of the test replies generated back to the actuator incorporating a unique reflector identifier; and, using the test replies to the test packet to sectionalize the communication network to isolate faults and performance problems.

In some embodiments, each unique reflector identifier is defined automatically by the reflector, for example, via a signaling exchange which may include a TWAMP control plane or via a configuration method, such as CLI, web-based configuration, and/or XML.

In some embodiments, each unique reflector identifier can be created by repurposing an uplink sequence number and using some of the bits of an uplink sequence number to encode a unique reflector identifier.

Other aspects of the present disclosure are directed to a system for establishing service operations administration and maintenance (OAM) sessions between an actuator and a plurality of reflectors in a communication network.

Additional aspects are directed to non-transient computer-readable storage media with processor-executable instructions for carrying out any of the methods disclosed herein.

The above summary is not intended to represent each embodiment or every aspect of the present disclosure. Rather, the summary merely provides an exemplification of some of the novel features presented herein. The above features and advantages, and other features and advantages of the present disclosure, will be readily apparent from the following detailed description of exemplary embodiments and modes for carrying out the present invention when taken in connection with the accompanying drawings and the appended claims.

BRIEF DESCRIPTION OF THE DRAWINGS

The foregoing and other advantages of the present disclosure will become apparent upon reading the following detailed description and upon reference to the drawings.

Figure 1:
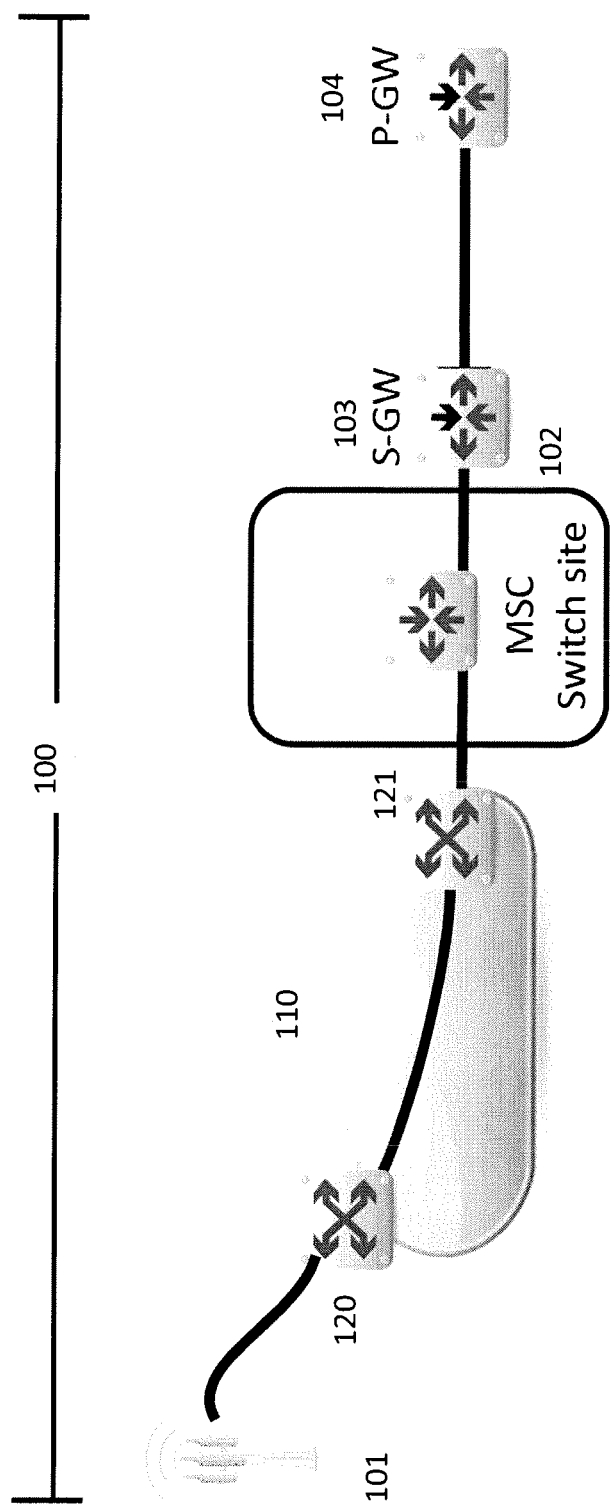
FIG. 1 illustrates a representative mobile network of a mobile operator.

While the invention is susceptible to various modifications and alternative forms, specific embodiments have been shown by way of example in the drawings and will be described in detail herein. It should be understood, however, that the invention is not intended to be limited to the particular forms disclosed. Rather, the invention is to cover all modifications, equivalents, and alternatives falling within the spirit and scope of the invention as defined by the appended claims.

DETAILED DESCRIPTION

The following discussion is intended to provide a brief, general description of suitable computer processing environments in which the methods and apparatus described herein may be implemented. In one non-limiting example, the method and apparatus will be described in the general context of processor-executable instructions, such as program modules, being executed in a distributed computing environment in which tasks may be performed by remote and local processing devices linked via one or more networks. Those of ordinary skill in the art will appreciate that the method may be practiced with any number of suitable computer system configurations and is not limited to the described configurations.

The following discussion is intended to provide a brief, general description of suitable computer processing environments in which the methods and apparatuses described herein may be implemented. In one non-limiting example, one or more methods and apparatuses will be described in the general context of processor-executable instructions, such as program modules, being executed in a distributed computing environment in which tasks may be performed by remote and local processing devices linked via one or more networks. Those of ordinary skill in the art will appreciate that the methods may be practiced with any number of suitable computer system configurations and is not limited to the described configurations.

The Service OAM framework is defined in standards such as Two-Way Active Measurement Protocol (TWAMP), [RFC5357], ITU-T Y.1731 and IEEE 802.1ag. It allows efficient delay and packet loss measurements via a bi-directional measurement function, i.e., 2×OneWay with the capability to measure and report all required metrics (delay, jitter, loss, reorder, etc.) for both directions (forward path and reverse path) to determine and report on the performance of the network.

In some embodiments, there is a need for the various protocols used as part of an OAM framework to operate either directly over a Layer 2 network as well as when the Ethernet Services are offered over a Layer 3 network infrastructure (IPv4 and/or IPv6).

The appended diagrams and illustrations are used to illustrate how the TWAMP metrics can be retrieved from a plurality of Network Interface Devices (NID) without the need for explicit layer-3 addressing to reach the NID devices. The TWAMP Actuator is usually configured with an explicit layer-3 address.

FIG. 1 illustrates a simplified network 100 operated, for example, by a mobile operator where a remote EnodeB 101 is accessed via a network 110 (Multiprotocol Label Switching (MPLS), Ethernet, or other) that is either managed by the mobile operator or the by a $3^{rd}$ party operating organization. In the illustrated embodiment, the remote EnodeB 101 interfaces with an MSC Switch Site 102 that further interfaces with a Signaling Gateway (S-GW) 103 and a Packet Data Network Gateway (P-GW) 104. The ingress and egress into the $3^{rd}$ party layer-2 network 110 is handled by a pair of layer-2 switches 120 and 121.

Figure 2:
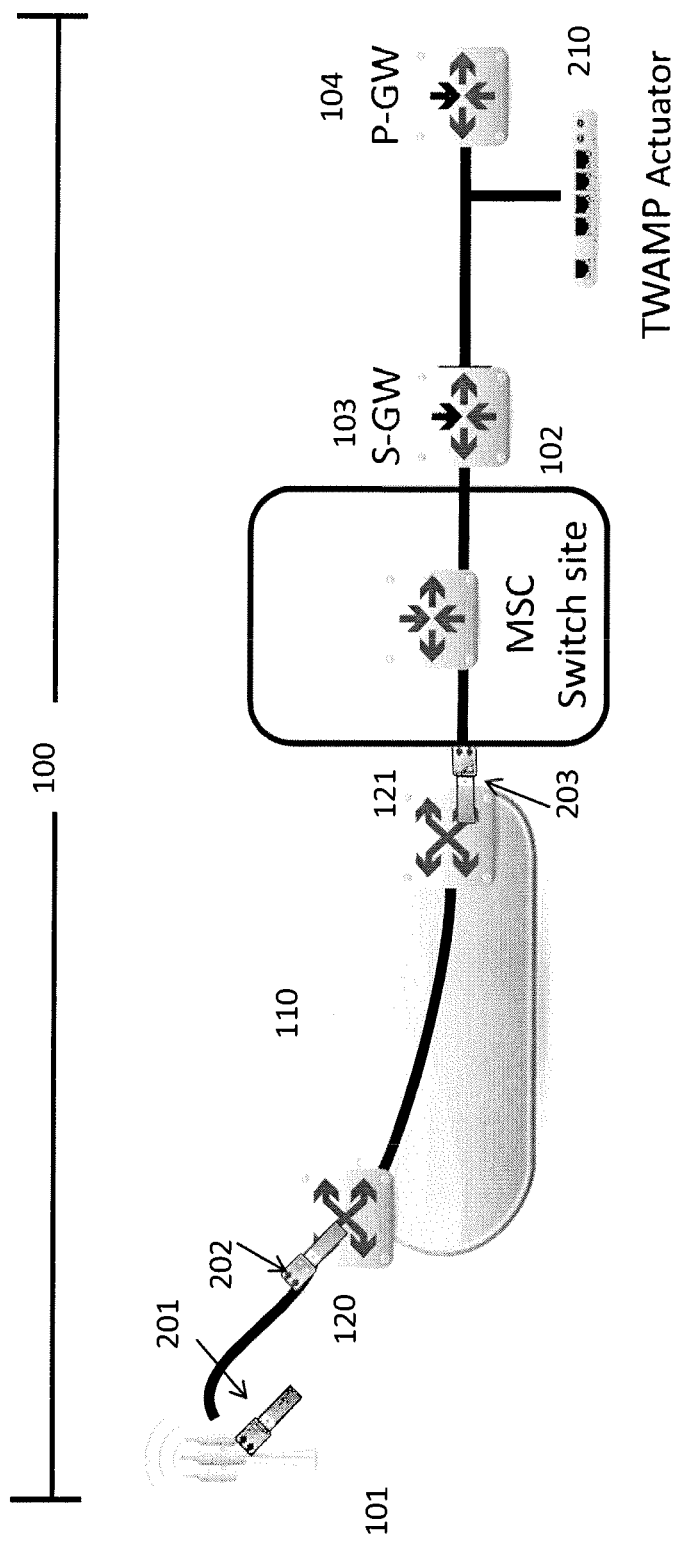
FIG. 2 illustrates the insertion of a plurality of representative Network Interface Devices (NID) and a representative Two-Way Active Measurement Protocol (TWAMP) Actuator into the mobile network of a mobile operator.

FIG. 2 illustrates that a plurality of NID devices 201, 202, and 203 are added to the network 100 for the purpose of providing a reflector function to process TWAMP requests generated by a TWAMP Actuator 210. The NID devices 201, 202, 203 do not need a unique layer-3 address; instead, they can borrow the IP address of the EnodeB 101 or of any other device at the end of the test path in the downstream direction from the TWAMP Actuator 210.

Figure 3:
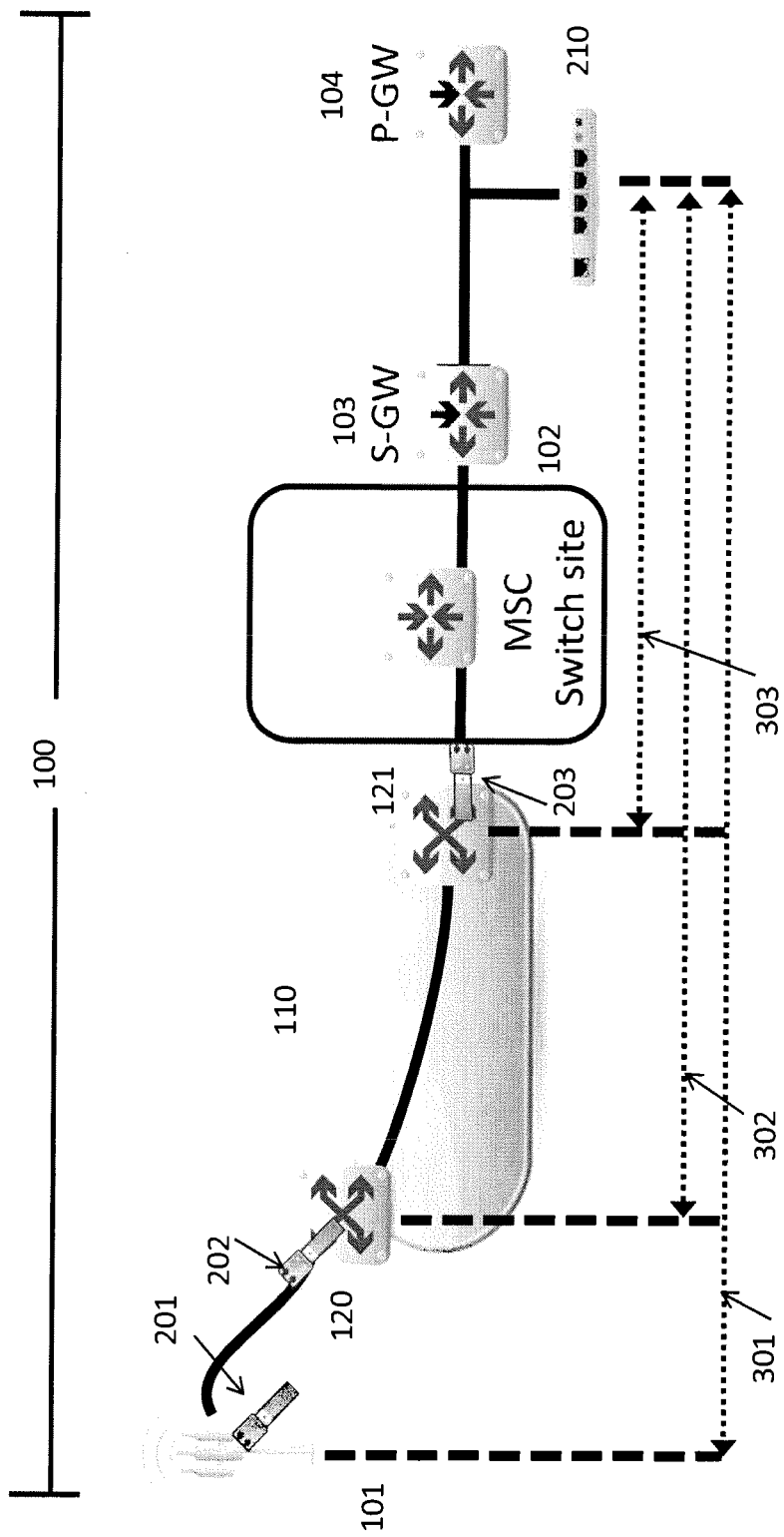
FIG. 3 illustrates how a representative TWAMP Actuator and a plurality of representative NID's sectionalize a network to isolate faults and performance problems.

FIG. 3 illustrates how the TWAMP Actuator 210 and the NID devices 201, 202, 203 can be used to sectionalize the network 100 to isolate faults and performance problems detected via TWAMP requests and replies between the TWAMP Actuator 210 and the NID devices 201, 202, 203. A TWAMP session 301 provides performance measurements end to end, but if there is a performance problem, the isolation of the problem may require additional tests to isolate the specific equipment or connection causing the problem. If the problem is transient, the subsequent tests may not be able to replicate the problem. Adding other simultaneous TWAMP sessions 302 and 303 and using the same TWAMP request over each of these sessions allow for a plurality of quasi-synchronous performance measurements, further increasing the likelihood of detecting and isolating the root cause of a transient performance problem. One-way and two-way packet delays and packet loss metrics can be measured for each TWAMP reply (one per TWAMP session 301, 302, 303) to determine which segment between a pair of NID devices 201, 202, 203 is responsible for the packet loss or for unacceptable delays. While the above may be achieved via a multiple of parallel TWAMP sessions, the correlation of the metrics is not as precise since each TWAMP session uses TWAMP requests that cannot reliably be correlated since their synchronicity cannot be assured.

Figure 4A:
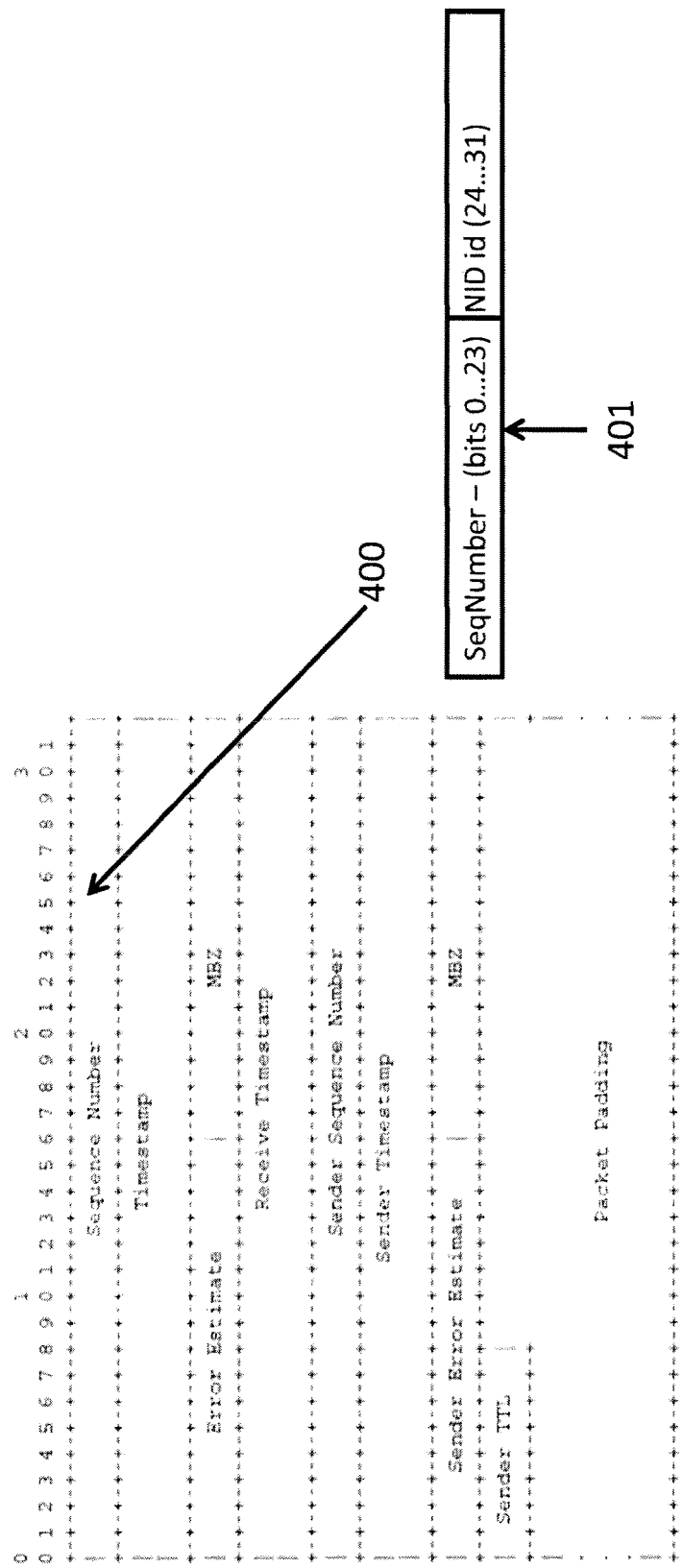
FIG. 4A illustrates the format of a representative TWAMP message data.

FIG. 4A illustrates a format of the TWAMP data exchanged between the TWAMP Actuator 210 and the NID devices 201, 202, 203. Of particular interest, aspects of this disclosure redefine the encoding of an Uplink Sequence Number 400. This field is defined as a 32-bit unsigned sequence number for packets returned to the TWAMP Actuator 210 by an NID device 201, 202, 203. As discussed in this disclosure, NID devices 201, 202, 203 are not assigned a unique layer-3 address and may all share the same UDP port number. Bits 24 to 31 of the Uplink Sequence Number 400 are therefore re-assigned as a unique NID identifier 401 and the Uplink Sequence Number is encoded with bits 0 to 23. The value of the NID identifier 401 is either configured for each NID device 201, 202, 203 or dynamically determined by each NID device 201, 202, 203 during the automatic discovery process or at a later time.

Figure 4B:
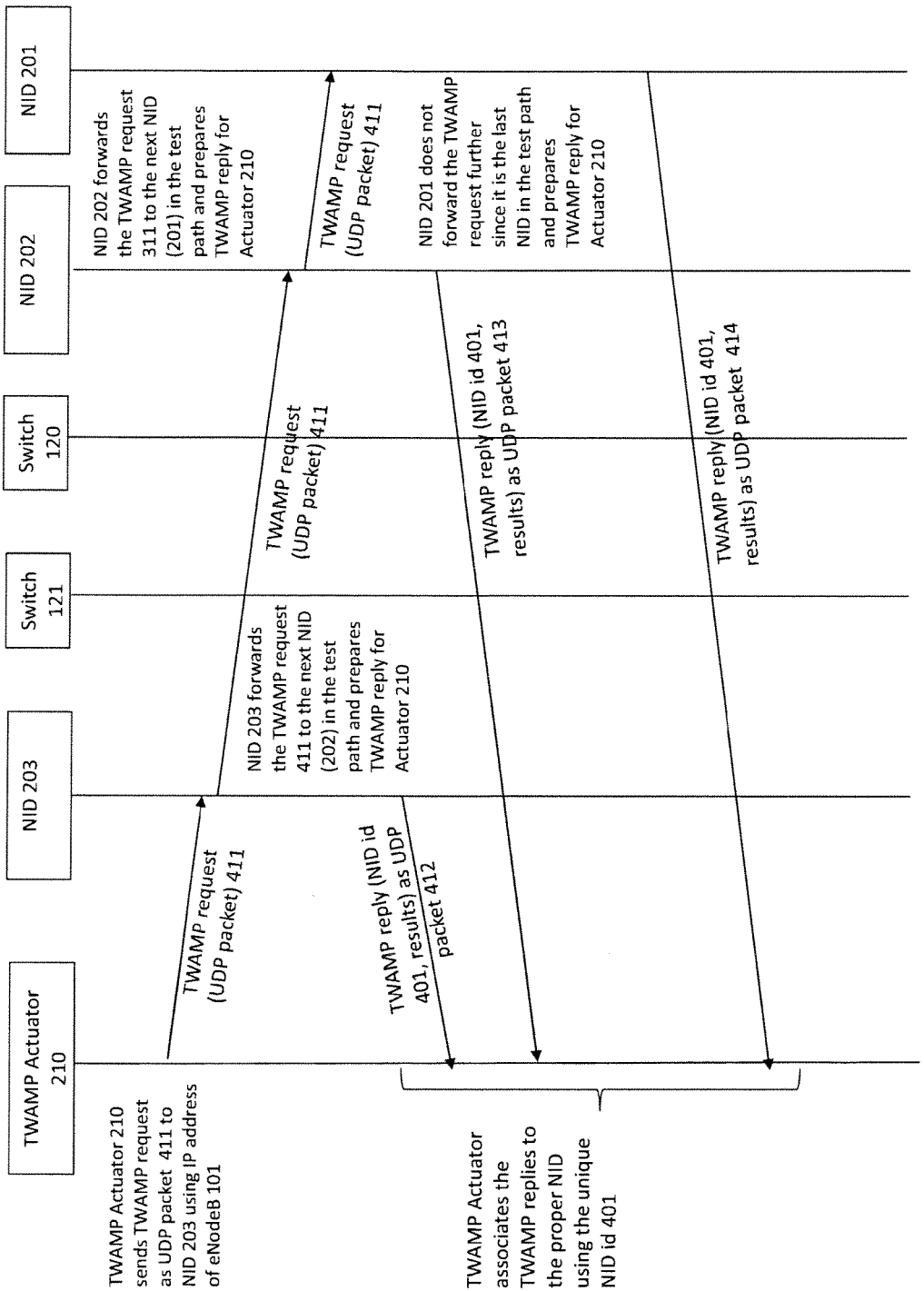
FIG. 4B is a representative diagram showing how a single TWAMP request can reach a plurality of NID's with a shared UDP port and without the need for an explicit layer-3 address.

FIG. 4B is an example of a protocol flow diagram that illustrates a flow of TWAMP messages between an Actuator 210 and NID devices 201, 202, 203. Looking at the flow diagram, the TWAMP Actuator 210 generates a first TWAMP Request 411 and encapsulates as a UDP packet. The UDP port number is set to a pre-agreed value and that reserved value is shared by each and every NID devices 201, 202, 203. The TWAMP Request 411 is addressed using the layer-3 address of a device that is located beyond the last NID device in the test path: in this example NID 201. The layer-3 address of the EnodeB device 101 located beyond NID 201 is determined, for example, as taught in U.S. patent application Ser. No. 13/552,063, which is incorporated herein by reference in its entirety and for all purposes. Upon receiving a first TWAMP request 411 at NID 203, NID 203 first determines whether it is the last NID device in the test path. In this example, it is not the last NID device and therefore forwards the TWAMP request 411 to the next NID device 202 in the test path. Before, during, or after forwarding the TWAMP request 411 to NID 202, NID 203 generates a TWAMP reply 412 with the requested performance metrics. TWAMP reply 412 includes a NID identifier 401 used by the TWAMP Actuator 210 to recognize that the TWAMP reply 412 originates from NID 203. The processing of TWAMP request 411 by NID 202 is similar to the processing by NID 203 where TWAMP request 411 is forwarded to NID 201 and where TWAMP reply 413 with the NID identifier 401 set to identify NID 202 and returned to the TWAMP Actuator 210. Upon receiving TWAMP request 411 at NID 201, NID 201 determines by configuration or otherwise that it is the last NID device in the test path and discards TWAMP request 411. NID 201 also generates TWAMP reply 414 with the NID identifier 401 back to the TWAMP Actuator 210.

By receiving multiple TWAMP replies 412, 413, and 414 from a single TWAMP request 411, it is possible to compare one-way and two-way delay information and packet loss information to efficiently determine the root cause of an unacceptable delay or of a packet loss without the need to generate additional TWAMP requests on different test paths, further increasing the probability of identifying and resolving transient problems that may otherwise be more difficult to isolate. Upon receiving TWAMP replies 412, 413, 414, the TWAMP Actuator 210 may determine that is should generate another TWAMP request/reply exchange with NID devices 201, 202, 203 in the test path by repeating the above steps as required. The TWAMP request 411 and the TWAMP replies 412, 413, 414 are transparently handled by any layer-2 switches 120, 121 in the test path as would any other packets destined to the EnodeB 101 or back to the TWAMP Originator 210.

An optional or alternative method to assign the NID identifier 401 is for the TWAMP Actuator 210 to set the NID identifier 401 to zero and for each NID 201, 202, 203 in the test path to increment the NID identifier 401 as it forwards the TWAMP request to the next NID in the downstream direction along the test path. A NID device will then copy this NID identifier 401 of the TWAMP request 411 into the TWAMP reply 412, 413, 414 to allow the TWAMP Actuator 210 to associate the TWAMP reply 412, 413, 414 to the appropriate NID (201, 202, 203).

Figure 5:
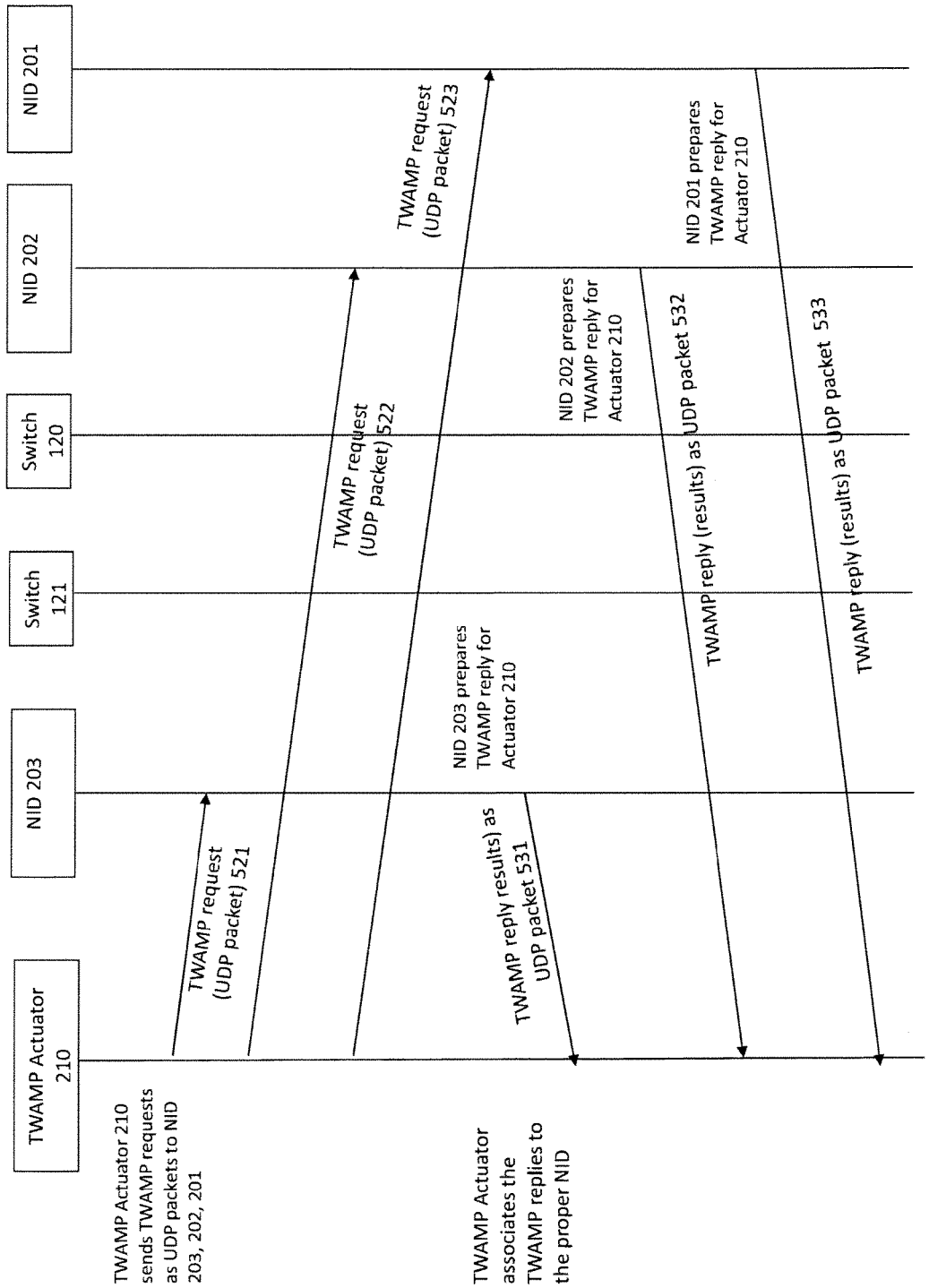
FIG. 5 is a representative diagram showing how multiple synchronous TWAMP requests are generated to reach a plurality of NID (each with unique UDP port numbers) without the need for an explicit layer-3 address.

FIG. 5 is another protocol flow diagram that illustrates an optional or alternative flow of TWAMP messages between an Actuator 210 and NID devices 201, 202, 203. Looking at the flow diagram, the TWAMP Actuator 210 generates a plurality of TWAMP Request 521, 522, and 523 with the smallest possible delay between them where they can be determined to almost be synchronous and encapsulates them as UDP packets. The UDP port number of each TWAMP request 521, 522, 523 can be set to a unique pre-agreed value for each NID device 201, 202, 203. The TWAMP Requests 521, 522, 523 are addressed using the layer-3 address of a device that is located beyond the last NID device in the test path: in this example, NID 201. The layer-3 address of the EnodeB device 101 located beyond NID 201 is determined, for example, as taught in U.S. patent application Ser. No. 13/552,063 and is the IP address shared by each NID 201, 202, 203. Upon receiving a first TWAMP request 521 at NID 203, NID 203 generates a TWAMP reply 531 with the requested performance metrics. The processing of TWAMP request 522 by NID 202 is similar to the processing by NID 203 where TWAMP reply 532 is prepared by NID 202 and returned to the TWAMP Actuator 210. Upon receiving TWAMP request 523 at NID 201, NID 201 generates TWAMP reply 533 back to the TWAMP Actuator 210.

By receiving multiple TWAMP replies 531, 532, and 533, it is possible to compare one-way and two-way delay information and packet loss information to efficiently determine the root cause of an unacceptable delay or of a packet loss, further increasing the probability of identifying and resolving transient problems that may otherwise be more difficult to isolate. Upon receiving TWAMP replies 531, 532, 533, the TWAMP Actuator 210 may determine that is should generate another TWAMP request/reply exchange with NID devices 201, 202, 203 in the test path by repeating the above steps as required. The TWAMP requests 522, 523 addressed for NID devices 201, 203 located on the opposite side of network 110 are transparently handled by layer-2 switches 120, 121 in the test path as would any other packets destined to the EnodeB 101 or back to the TWAMP Originator 210.

Figure 6:
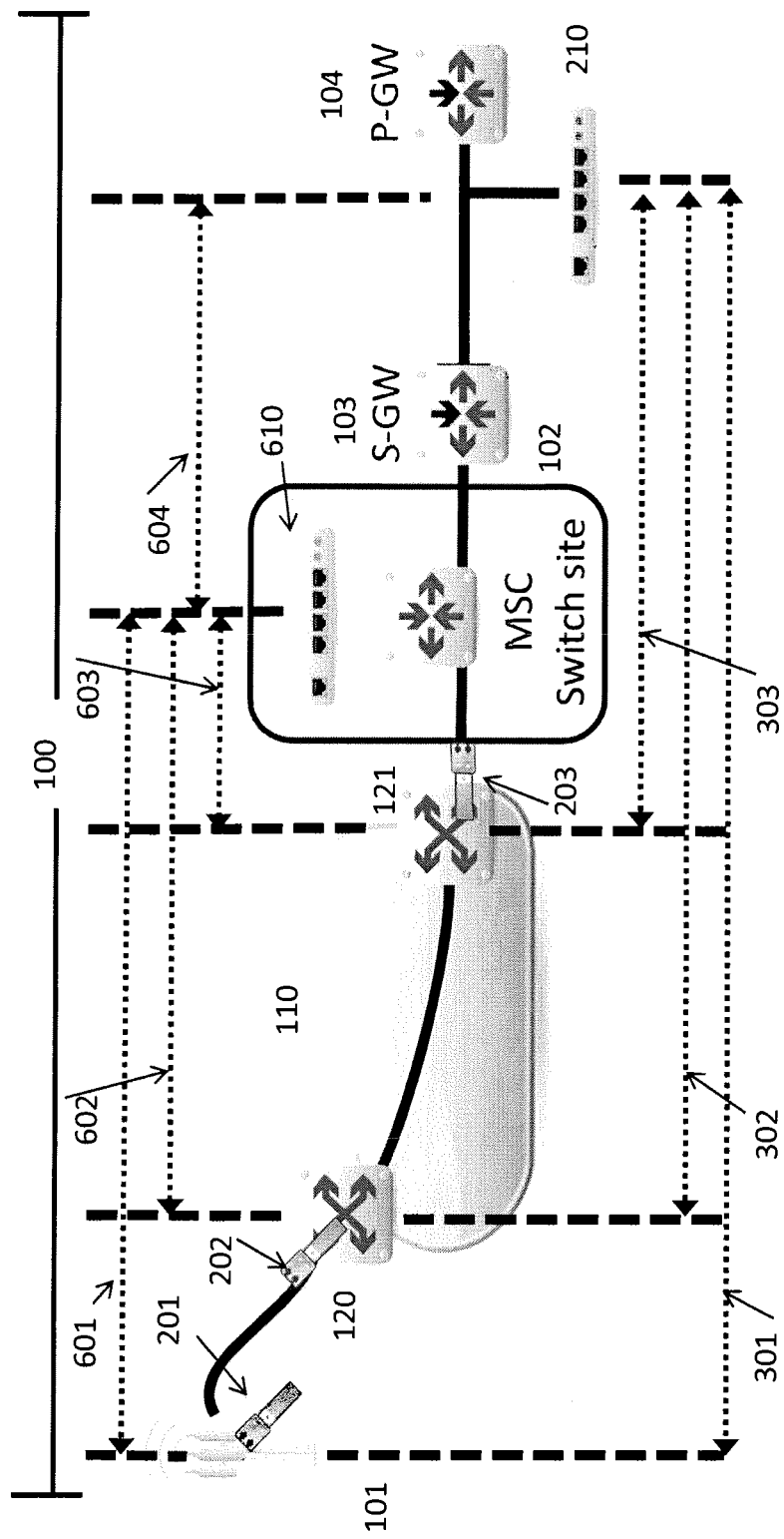
FIG. 6 illustrates how an additional TWAMP Actuator can further help to sectionalize a network and isolate faults and performance problems.

Looking at FIG. 6, it illustrates how the addition of another TWAMP Actuator 610 judiciously placed at the MSC Switch Site 102 can be used to further sectionalize the network 100 and complement the ability to isolate faults and performance issues when compared to using a single TWAMP Actuator 210. Adding TWAMP Actuator 610 results into additional TWAMP sessions 601, 602, and 603 toward NID devices 201, 202, 203 and TWAMP session 604 between TWAMP Actuators 210, 610, where the TWAMP Actuators 210, 610 are also capable of acting as a TWAMP Reflectors in the same way as NID devices 201, 202, 203. Looking again at FIG. 6, one can see that there are now enough TWAMP sessions 301, 302, 303, 601, 602, 603, 604 to cover each and every segments of network 100 under the control of the mobile operator.

One or more or all of the embodiments described herein can be applicable to software-based, HW-based and pluggable (FPGA) Actuators and NID devices.

The present disclosure includes systems having processors to provide various functionalities to process information and to determine results based on inputs. Generally, the processing may be achieved with a combination of hardware and software elements. The hardware aspects may include combinations of operatively coupled hardware components including, for example, microprocessors, logical circuitry, communication/networking ports, digital filters, memory, and/or logical circuitry. The processors may be adapted to perform operations specified by a computer-executable code, which may be stored on a computer-readable medium.

The steps of the methods described herein may be achieved via an appropriate programmable processing device, such as an external conventional computer or an on-board field programmable gate array (FPGA) or digital signal processor (DSP), which executes software, or stored instructions. In general, physical processors and/or machines employed by embodiments of the present disclosure for any processing or evaluation may include one or more networked or non-networked general purpose computer systems, microprocessors, field programmable gate arrays (FPGA's), digital signal processors (DSP's), microcontrollers, and the like, programmed according to the teachings of the exemplary embodiments of the present disclosure, as is appreciated by those skilled in the art. Appropriate software can be readily prepared by programmers of ordinary skill based on the teachings of the exemplary embodiments, as is appreciated by those skilled in the art. In addition, the devices and subsystems of the exemplary embodiments can be implemented by the preparation of application-specific integrated circuits or by interconnecting an appropriate network of conventional component circuits, as is appreciated by those skilled in the art. Thus, the exemplary embodiments are not limited to any specific combination of hardware circuitry and/or software.

Stored on any one or on a combination of computer readable media, the exemplary embodiments of the present disclosure may include software for controlling the devices and subsystems of the exemplary embodiments, for driving the devices and subsystems of the exemplary embodiments, for processing data and signals, for enabling the devices and subsystems of the exemplary embodiments to interact with a human user, and the like. Such software can include, but is not limited to, device drivers, firmware, operating systems, development tools, applications software, and the like. Such computer readable media further can include the computer program product of an embodiment of the present disclosure for performing all or a portion (if processing is distributed) of the processing performed in implementations. Computer code devices of the exemplary embodiments of the present disclosure can include any suitable interpretable or executable code mechanism, including but not limited to scripts, interpretable programs, dynamic link libraries (DLLs), Java classes and applets, complete executable programs, and the like. Moreover, parts of the processing of the exemplary embodiments of the present disclosure can be distributed for better performance, reliability, cost, and the like.

Common forms of computer-readable media may include, for example, a floppy disk, a flexible disk, hard disk, magnetic tape, any other suitable magnetic medium, a CD-ROM, CDRW, DVD, any other suitable optical medium, punch cards, paper tape, optical mark sheets, any other suitable physical medium with patterns of holes or other optically recognizable indicia, a RAM, a PROM, an EPROM, a FLASH-EPROM, any other suitable memory chip or cartridge, a carrier wave or any other suitable medium from which a computer can read.

While particular implementations and applications of the present disclosure have been illustrated and described, it is to be understood that the present disclosure is not limited to the precise construction and compositions disclosed herein and that various modifications, changes, and variations can be apparent from the foregoing descriptions without departing from the spirit and scope of the invention as defined in the appended claims.

What is claimed is:

1. A method for improving isolation of faults in a communication network using an Operations Administration and Maintenance (OAM) framework, the method comprising:
    establishing a service operations administration and maintenance session between actuator and a plurality of reflectors in a sequence along a path for collecting one or more performance metrics specific to each reflector, wherein said actuator is coupled to a first of said plurality of reflector;
    transmitting by the actuator a single test packet to the first reflector;
    transmitting by the first reflector the single test packet to a next reflector in the sequence, wherein the test packet comprises a layer 3 address and a layer 2 address, and the first reflector modifies the layer 2 address prior to forwarding the test packet to the next reflector;
    transmitting by the next reflector, the single test packet to another next reflector in the sequence until a last reflector is reached, wherein the next reflector modifies the layer 2 address prior to forwarding the test packet to another next reflector;
    transmitting, by each reflector in the test path, a test reply to the actuator, each of the test replies incorporating a unique reflector identifier and performance metrics specific to each reflector;
    and
    sectionalizing the communication network using said performance metrics specific to each reflector and wherein the faults are isolated via Two-Way Active Measurement Protocol (TWAMP) requests and replies between the actuator and the plurality of reflectors.

2. The method of claim 1, further comprising: assigning a test reply from a reflector to the appropriate reflector, wherein a sequence number is redefined to include a unique reflector identifier.

3. The method of claim 2, wherein the unique reflector identifier is created by repurposing an uplink sequence number and using some of the bits of an uplink sequence number to encode the unique reflector identifier.

4. The method of claim 2, wherein the unique reflector identifier is either assigned statically for each reflector or is dynamically determined.

5. The method of claim 1, wherein the unique reflector identifier is defined automatically via a signaling exchange.

6. The method of claim 5, wherein the signal exchange comprises a TwoWay Active Measurement Protocol (TWAMP) control plane or a configuration method such as CLI, web-based configuration, and/or XML.

7. The method of claim 1, wherein the plurality of reflectors do not require unique layer-3 addressing information.

8. The method of claim 1, wherein the plurality of reflectors borrow an IP address of another device downstream to the last reflector along the test path.

9. The method of claim 1, wherein the performance metrics comprise oneway packet delay, two-way packet delay, packet loss metrics, or a combination thereof.

10. A system for improving isolation of faults in a communication network using an Operations Administration and Maintenance (OAM) framework, the system comprising:
    a processor;
    a plurality of reflectors in a sequence along a path for collecting one or more performance metrics specific to each reflector along a path;
    an actuator, coupled with a first reflector, establishing a service operations administration and maintenance session with the plurality of reflectors;
    a single test packet transmitted by the actuator to the first reflector; wherein the first reflector transmits the single test packet to a next reflector in the sequence and said next reflector transmits the single test packet to another next reflector in the sequence until a last reflector is reached; wherein the test packet comprises a layer 3 address and a layer 2 address, and the reflector modifies the layer 2 address prior to forwarding the test packet to the next reflector;
    a test reply packet transmitted by each reflector replies directly to the actuator wherein said test reply comprises a unique reflector identifier along with said performance metrics specific to each reflector; and wherein the communication network is sectionalized using said performance metrics specific to each reflector; and
    wherein the faults are isolated via Two-Way Active Measurement Protocol (TWAMP) requests and replies between the actuator and the plurality of reflectors.

* * * * *

UNITED STATES PATENT AND TRADEMARK OFFICE
CERTIFICATE OF CORRECTION

PATENT NO.         : 10,135,713 B2
APPLICATION NO.    : 15/403362
DATED              : November 20, 2018
INVENTOR(S)        : Claude Robitaille Page 1 of 1

It is certified that error appears in the above-identified patent and that said Letters Patent is hereby corrected as shown below:

In the Claims

At Column 8, Line 56 (Claim 10) after "each reflector" delete "replies"

At Column 8, Line 57 (Claim 10) before "to the actuator" delete "directly"

Signed and Sealed this
Seventh Day of July, 2020

Andrei Iancu
*Director of the United States Patent and Trademark Office*